(12) United States Patent
Wang et al.

(10) Patent No.: US 7,794,156 B2
(45) Date of Patent: Sep. 14, 2010

(54) INTERNAL EMI WASHER FOR OPTICAL TRANSCEIVER WITH PARALLEL OPTIC FIBER RIBBON

(75) Inventors: Xiaozhong X. Wang, Sunnyvale, CA (US); Seng-Kum Chan, Santa Clara, CA (US); Edmond Lau, Sunnyvale, CA (US); Robert Mosebar, San Jose, CA (US)

(73) Assignee: Emcore Corporation, Albuquerque, NM (US)

( * ) Notice: Subject to any disclaimer, the term of this patent is extended or adjusted under 35 U.S.C. 154(b) by 527 days.

(21) Appl. No.: 11/846,271

(22) Filed: Aug. 28, 2007

(65) Prior Publication Data

US 2009/0060519 A1  Mar. 5, 2009

(51) Int. Cl.
*G02B 6/36* (2006.01)
*H04B 10/00* (2006.01)
*H01R 33/945* (2006.01)
(52) U.S. Cl. .......................... 385/87; 385/53; 385/114; 385/88; 398/135; 398/139; 439/577
(58) Field of Classification Search ............... 385/88, 385/89, 86, 87, 92, 93, 94, 114, 53; 398/134, 398/135, 136, 137, 138, 139; 439/577
See application file for complete search history.

(56) References Cited

U.S. PATENT DOCUMENTS

| | | | |
|---|---|---|---|
| 6,305,961 B1 * | 10/2001 | Szilagyi et al. | 439/271 |
| 6,482,017 B1 * | 11/2002 | Van Doorn | 439/89 |
| 6,713,672 B1 * | 3/2004 | Stickney | 174/382 |
| 6,856,769 B1 * | 2/2005 | Steffensen et al. | 398/135 |
| 6,905,257 B2 * | 6/2005 | Eichenberger et al. | 385/89 |
| 7,021,837 B2 * | 4/2006 | Eichenberger et al. | 385/89 |
| 7,331,720 B1 * | 2/2008 | McColloch | 385/88 |
| 2007/0140621 A1 * | 6/2007 | DeCusatis et al. | 385/53 |
| 2009/0060519 A1 * | 3/2009 | Wang et al. | 398/139 |

* cited by examiner

*Primary Examiner*—Brian M Healy

(57) ABSTRACT

An optical transceiver including an optical fiber ribbon, a housing permanently attached to the optical fiber ribbon, and an electrical connector extending from the housing. An electro/optical converter is disposed within the housing including an array of VCSELs and an array of photodiodes rigidly coupled to a ferrule supporting respective fibers of the fiber ribbon. A member is disposed on an outer surface of the housing adjacent the aperture that resists sharp bending of the optical fiber ribbon where the ribbon exits the housing through the aperture and blocks leakage of electromagnetic radiation from the housing.

17 Claims, 1 Drawing Sheet

INTERNAL EMI WASHER FOR OPTICAL TRANSCEIVER WITH PARALLEL OPTIC FIBER RIBBON

FIELD OF THE INVENTION

The field of the invention relates to optical communication systems and more particularly to an optical communication transceiver with a parallel optic fiber ribbon.

BACKGROUND OF THE INVENTION

High speed optical communications systems are generally known. Such systems typically include a transmitter optical subassembly (TOSA) and a receiver optical subassembly (ROSA) connected via an optical fiber.

The TOSA may generally include one or more laser diodes. In some devices, an array of vertical cavity surface emitting lasers (VCSELs) are used to generate optical signals that are coupled through an optical fiber ribbon that includes an equal number of fibers. A corresponding array of photodetectors within the ROSA are used to detect a respective optical signal within each of the optical fibers of the fiber ribbon.

The TOSA and ROSA are often operated in the GHz range. As with any device operated at such a high frequency, optical transceivers generate significant electromagnetic interference (EMI).

EMI generated by electro-optical converters generally propagates in all directions. In order to minimize such radiation and in order to meet FCC requirements, manufacturers usually enclose the ROSA and TOSA in an electrically conductive housing. The electrically conductive housing absorbs and reduces EMI.

However, the electrically conductive housing must be provided with openings for electrical and optical connections (e.g., an electrical cable, a "ribbon" of multiple parallel optical fibers, etc.). Whenever the external housing is penetrated by an electrical or optical connection, the potential exists for EMI leakage. Moreover, when a fiber ribbon is used, the EMI emitted may increase in direct proportion to the number of fibers in the fiber ribbon due to the larger hole. Because of the importance of optical communications, a need exists for better methods of reducing the leakage of EMI where a ribbon of optical fibers enter a housing.

SUMMARY

Briefly, and in general terms, the claimed invention provides an optical transceiver for converting and coupling an information-containing electrical signal with a plurality of parallel optical fibers within an optical fiber ribbon. The optical transceiver includes the optical fiber ribbon and a housing permanently attached to the optical fiber ribbon. The housing includes a top portion and a bottom portion and an aperture for entry for the optical fiber ribbon. The optical transceiver also includes an electrical connector extending from the housing and an electro/optical converter disposed within the housing and coupled to the ribbon and to the electrical connector. The electro/optical converter includes an array of VCSELs and an array of photodiodes rigidly coupled to a ferrule supporting respective fibers of the fiber ribbon, the electro/optical converter converting between the information-containing electrical signal of the electrical connector and modulated optical signals corresponding to the electrical signal for transport over the optical fibers in the optical fiber ribbon. The optical transceiver further includes a strain relief bushing disposed on an outer surface of the housing adjacent the aperture that resists sharp bending of the optical fiber ribbon where the ribbon exits the housing through the aperture. A resilient, electrically conductive washer is disposed around the optical fiber ribbon within the aperture and between the optical fiber ribbon and housing, wherein the washer blocks leakage of electromagnetic radiation from the housing.

In another aspect, the invention provides an electro/optical converter within the housing coupled between the electrical connector and optical fiber ribbon. The electro/optical converter has an array of VCSELs and array of photodiodes with at least some VCSELs and/or photodiodes optically coupled to respective optical fibers of the optical fiber ribbon. The electro/optical converter converts information signals between an electrical transmission format of at least some terminals of the electrical connector and an optical transmission format of respective optical fibers of the optical fiber ribbon.

In another aspect, the invention provides a plurality of electro/optical converters within the housing coupled between at least some terminals of the electrical connector and respective optical fibers of the optical fiber ribbon. The electro/optical converters include an array of VCSELs and array of photodiodes with a least some VCSELs and/or photodiodes optically coupled to respective optical fibers of the optical fiber ribbon and the electro/optical converter converts information packets between an electrical transmission format of at least some pins of the electrical connector and an optical transmission format of respective optical fibers of the optical fiber ribbon.

In another aspect, the invention provides the washer as a two-piece assembly including an upper portion disposed within the top portion of the housing and a bottom portion disposed within the bottom portion of the housing.

In another aspect, the washer is made from metalized foam.

In anther aspect, the washer is made from metal impregnated rubber.

In another aspect, the washer is made from a carbon impregnated elastomer.

In another aspect, the invention provides the optical fiber ribbon with up to 24 optical fibers.

In another aspect, the invention provides the transceiver with a transmission speed up to 10 GHz per channel.

DETAILED DESCRIPTION OF AN ILLUSTRATED EMBODIMENT

Figure 1:
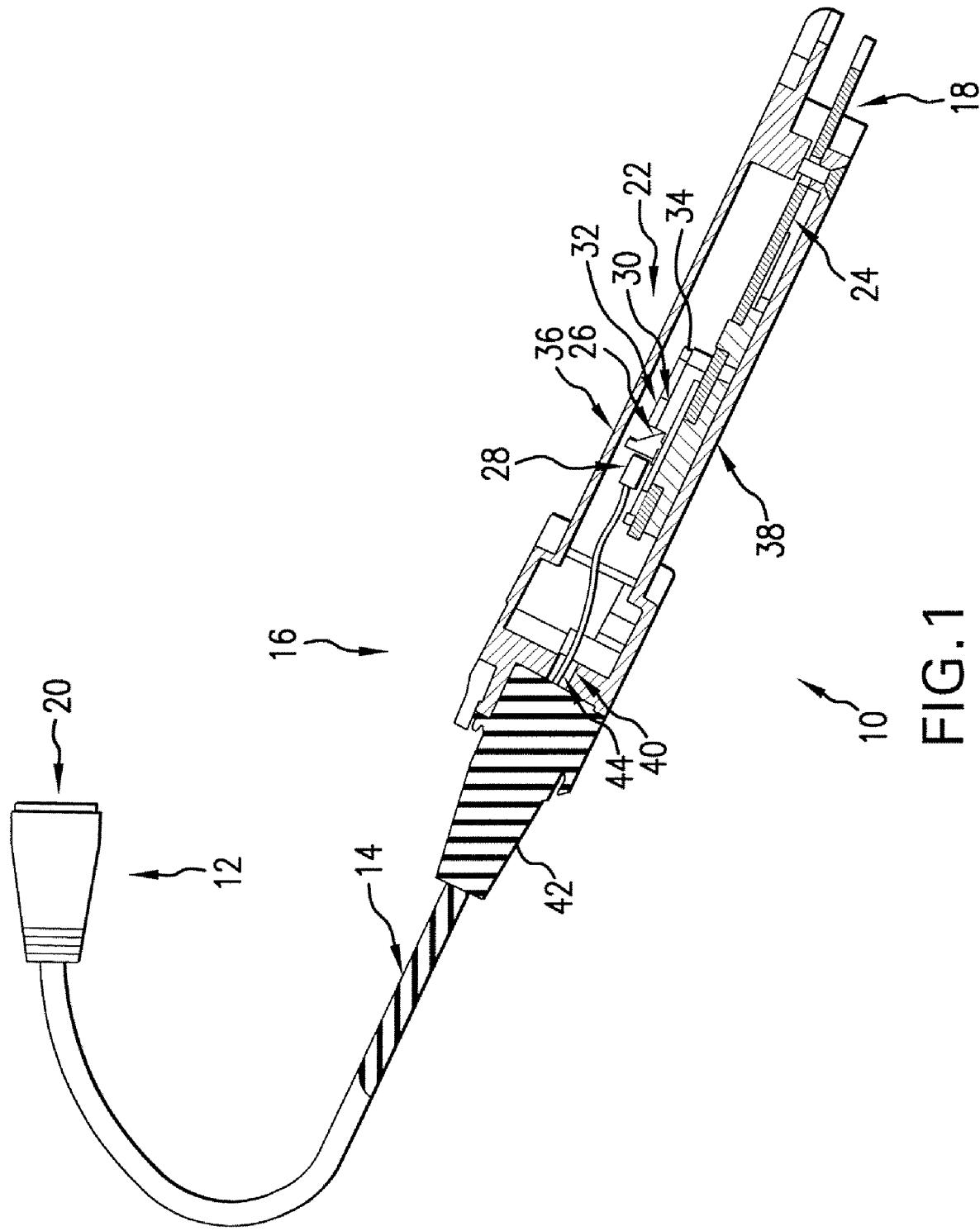
FIG. 1 depicts a communication cable that includes an optical transceiver in accordance with an illustrated embodiment of the invention.

FIG. 1 is a partial cut-away side view of a communication cable 10 operating at some appropriate high-speed transmission rate (e.g., 10 Ghz) shown generally in accordance with an illustrated embodiment of the invention. The communication cable 10 provides a high speed communications link between information units (not shown) that may be located some distance apart. The information units may be host computers, Internet routers, etc.

The communication cable 10 may include a plug 12, 16 disposed on each opposing end of the cable 10. An electrical connector 18, 20 may be provided within each of the plugs 12, 16.

The electrical connectors 18, 20 on opposing ends are provided with sufficient electrical connector pins (e.g., a 100- pin Mega Array electrical connector) to exchange information signals between the information units under an appropriate multi-channel format (e.g., InfiniBand 4-channel, InfiniBand 12-channel, etc.). The plugs 12, 16 function to convert the information signals between an electrical format used for transmission through the electrical connectors 18, 20 and a corresponding optical format used for transmission through a fiber ribbon cable 14 that connects to and that is permanently attached to the plugs 12, 16.

It should be noted that the fiber ribbon 14 is the sole and only connection between the plugs 12, 16. Power needed for any signal conversion and/or processing within the plugs 12, 16 is received through the respective electrical connector 18, 20.

In general, the plugs 12, 16 each operate as transceivers including a two-way electro/optical converter 22 on each end for each channel. A respective optical fiber of the fiber ribbon 14 is connected between electro/optical converters 22 located at opposing end of the cable 10. The fiber ribbon 14 is integrated into the plugs 18, 20 on opposing ends and cannot be disconnected from the plugs 12, 16. Each electro/optical converter 22 converts between an optical format on a respective optical fiber of the fiber ribbon and an electrical signal format on the set of electrical terminals that are reserved for the channel on which the electro/optical converter 22 operates.

The electro/optical converters 22 may be incorporated into one or more integrated circuit devices. For example, where the cable 10 is constructed to operate under an InfiniBand 12-channel format, then 12 electro/optical converters 22 may be included in which each electro/optical converter 22 uses one VCSEL of a 1×12 oxide-confined VCSEL array as an optical transmitter. Similarly, each electro/optical converter 22 may use one photodiode of a high-speed photodiode array as an optical receiver. The converters 22 perform logic-to-light and light-to-logic conversions for data transmission over respective fibers of the multi-mode fiber ribbon at an appropriate wavelength (e.g., 850 nm).

Turning now to the plugs 12, 16 in specific, FIG. 1 is a cut-away side view that shows at least one channel of the plug 16 of the multi-channel array of the cable 10. As shown, a set of electrical conductors 24 connect the electro/optical converters 22 with respective terminals of the electrical connector 18. A lens array 26 is disposed between the electro/optical converters 22 and a ferrule 28 of the fiber ribbon 28. Within the plugs 12, 16, a circuit board 34 may be used to rigidly support the ferrule 28 of the fiber ribbon 14 relative to the lens array 26, the VCSEL array 30 and the photodiode array of the electro/optical converters 22.

The circuit board 34 is, in turn, enclosed in an electrically conductive housing including an upper portion or shell 36 and a lower portion or shell 38. The fiber ribbon cable 14 is attached to the housing via a strain relief bushing 42 that resists sharp bends or pulling of the fiber ribbon cable 14 out of the plug 12, 16.

The housing includes an aperture 40 through which the fiber ribbon cable 14 passes. The aperture 40 has the shape of a slot with a width slightly larger than the size of the fiber ribbon and a height slightly larger than the height of fiber ribbon. In prior art devices, the height was required to be greater than the height of the optical fiber so that normal variations in tolerances did not result in pinching of (and damage to) the optical fibers where the fiber ribbon 14 passes between the top and bottom shells 36, 38.

Under the prior art, the fiber ribbon cable 14 was left to float freely within the aperture 40. However, it has been found that significant EMI can escape the enclosure through the space between the walls of the aperture 40. The EMI radiation is exacerbated when the spacing is increased to allow for normal tolerance variations.

Moreover, as the number of fibers within the fiber ribbon cable 14 increases, the width lying in the dimension along the flat axis extending transversely across the fiber cable 14 becomes greater thereby allowing longer and longer wavelengths of EMI to escape. Tolerances in the transverse direction further increase this problem.

Under one illustrated embodiment, the space between the walls of the aperture 40 and fiber ribbon cable 14 is filled with a resilient, electrically conductive washer or bushing 44 that blocks leakage of electromagnetic radiation from the housing. The washer 44 is resilient to completely occupy the space between the fiber ribbon cable 14 and walls of the aperture 40 even under conditions of severe out-of-tolerance conditions. The washer 44 is electrically conductive to damp and absorb EMI produced by the conductors 24 and electro/optic converters 22.

The washer 44 may be constructed in two pieces including a top portion and a bottom portion. The top and bottom portions of the washer 44 may be provided as a strip or strips of material due to the fact that the washer 44 would mate with the top and bottom halves of the fiber ribbon cable 14 which is itself flat on both sides.

Under one illustrated embodiment, the washer 44 is constructed of a soft conductive foam. The foam is soft so that the fiber ribbon cable 14 can move relative to the housing without imparting significant force to and without causing damage to the fiber ribbon cable 14. Moreover, the resilience of the washer 44 and electrically conductive nature of the washer 44 causes the washer 44 to become electrically connected to the housing thereby allowing the washer 44 to form a continuous extension of the shielding of the housing that continuously contacts the fiber ribbon cable 14 within the aperture 40 without gaps or cracks through which EMI can leak out from.

The washer 44 may be fabricated of any of a number of different resilient materials. Under a first embodiment, the washer 44 may be made of foam strips coated with a conductive material (e.g., conductive woven material, carbon, metalization, etc.). Under other embodiments, the washer 44 may be fabricated of a carbon or metal impregnated elastomer, such as rubber.

Under still further embodiments, the washer 44 may be fabricated in place. In this case, a conductive material may be disposed on opposing walls of the aperture 44 and the upper and lower shells 36, 38 placed around the fiber ribbon 14 and held stationary as the formed-in-place washer 44 hardens.

A specific embodiment of apparatus for reducing EMI in an optical cable has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. An optical transceiver for converting and coupling an information-containing electrical signal with a plurality of parallel optical fibers comprising:

an optical fiber ribbon;

a housing permanently attached to the optical fiber ribbon, said housing including a top portion and a bottom portion and an aperture for entry for the optical fiber ribbon, wherein the aperture is defined by the top and bottom portions when mated;

an electrical connector extending from the housing;

an electro/optical converter disposed within the housing and coupled to the fiber ribbon and to the electrical connector, the electro/optical converter including an array of VCSELs and an array of photodiodes rigidly coupled to a ferrule supporting respective fibers of the fiber ribbon, said electro/optical converter converting between the information-containing electrical signal of the electrical connector and modulated optical signals corresponding to the electrical signal for transport over the optical fibers in the optical fiber ribbon;

a strain relief bushing disposed on an outer surface of the housing adjacent to the aperture that resists sharp bending of the optical fiber ribbon where the optical fiber ribbon exits the housing through the aperture; and a resilient, electrically conductive washer disposed around the optical fiber ribbon within the aperture and between the optical fiber ribbon and housing, wherein the washer further comprises a two-piece assembly including an upper portion disposed within the top portion of the housing and a lower portion disposed within the bottom portion of the housing, wherein the washer blocks leakage of electromagnetic radiation from the housing when the top and bottom portions of the housing are mated together.

2. The optical transceiver as in claim 1, wherein the washer further comprises metalized foam.

3. The optical transceiver as in claim 1, wherein the washer further comprises metal impregnated rubber.

4. The optical transceiver as in claim 1, wherein the washer further comprises a carbon impregnated elastomer.

5. The optical transceiver as in claim 1, wherein the optical fiber ribbon further comprises up to twenty-four optical fibers.

6. The optical transceiver as in claim 1, further comprising a transmission speed of up to 10 GHz per channel.

7. An electro/optical transceiver comprising:

a housing;

an electrical connector extending from the housing;

a optical fiber ribbon having a plurality of optical fibers extending outwardly from the housing through an aperture in the housing, said optical fiber ribbon being permanently affixed to the housing, wherein the housing includes a top portion and a bottom portion and the aperture is defined by the top and bottom portions when mated;

an electro/optical converter within the housing coupled between the electrical connector and optical fiber ribbon, said electro/optical converter having an array of VCSELs and array of photodiodes with a least some VCSELs and/or photodiodes optically coupled to respective optical fibers of the optical fiber ribbon, said electro/optical converter converting information signals between an electrical transmission format and an optical transmission format of respective optical fibers of the optical fiber ribbon; and a resilient, electrically conductive washer disposed within the aperture between the optical fiber ribbon and housing, wherein the washer further comprises a two-piece assembly including an upper portion disposed within the top portion of the housing and a lower portion disposed within the bottom portion of the housing, wherein the washer blocks leakage of electromagnetic radiation from the housing when the top and bottom portions of the housing are mated together.

8. The optical transceiver as in claim 7, wherein the washer further comprises metalized foam.

9. The optical transceiver as in claim 7, wherein the washer further comprises metal impregnated rubber.

10. The optical transceiver as in claim 7, wherein the washer further comprises a carbon impregnated elastomer.

11. The optical transceiver as in claim 7, wherein the optical fiber ribbon further comprises twelve optical fibers.

12. An electro/optical transceiver comprising:

a housing;

a optical fiber ribbon having a plurality of optical fibers extending outwardly from the housing through an aperture in the housing, said optical fiber ribbon being permanently affixed to the housing, wherein the housing includes a top portion and a bottom portion and the aperture is defined by the top and bottom portions when mated;

a plurality of electro/optical converters within the housing coupled between at least some terminals of an electrical connector and respective optical fibers of the optical fiber ribbon, said electro/optical converters including an array of VCSELs and array of photodiodes with a least some VCSELs and/or photodiodes optically coupled to respective optical fibers of the optical fiber ribbon, said electro/optical converter converting information between an electrical transmission format and an optical transmission format of respective optical fibers of the optical fiber ribbon; and a resilient, conductive member disposed around the optical fiber ribbon within the aperture, wherein the member further comprises a two-piece assembly including an upper portion disposed within the top portion of the housing and a lower portion disposed within the bottom portion of the housing, wherein the member blocks leakage of electromagnetic radiation from the housing when the top and bottom portions of the housing are mated together.

13. The optical transceiver as in claim 12, wherein the member further comprises metalized foam.

14. The optical transceiver as in claim 12, wherein the member further comprises metal impregnated rubber.

15. The optical transceiver as in claim 12, wherein the member further comprises a carbon impregnated elastomer.

16. The optical transceiver as in claim 12, wherein the optical fiber ribbon further comprises twelve optical fibers.

17. The optical transceiver as in claim 12, wherein the optical fiber ribbon further comprises four optical fibers.

* * * * *